A. & A. DAVIS & C. CUNNINGHAM.
Carbureter.
No. 14,129.
Patented Jan. 15, 1856.
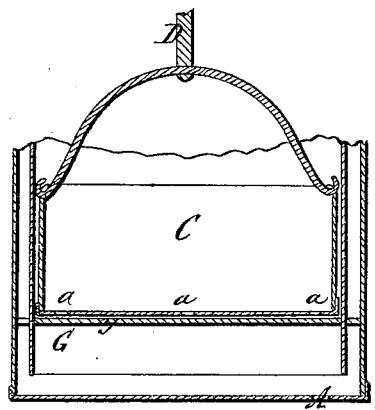
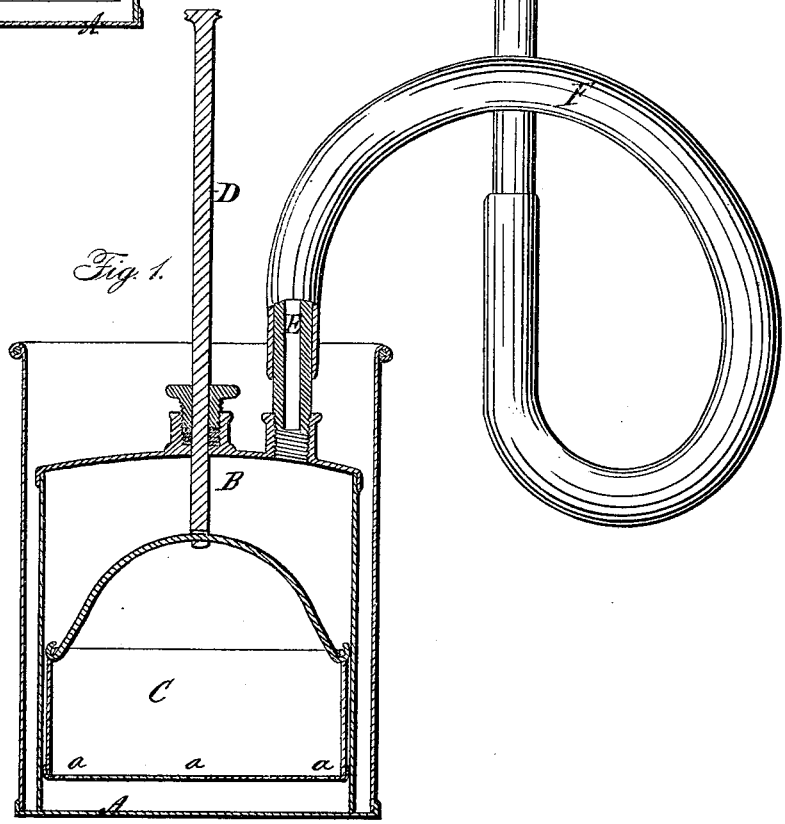

UNITED STATES PATENT OFFICE.

ARI DAVIS AND ASAHEL DAVIS, OF LOWELL, MASSACHUSETTS, AND CHARLES CUNNINGHAM, OF NASHUA, NEW HAMPSHIRE, ASSIGNORS TO A. W. ADAMS, J. B. RICHARDSON, GEO. W. PETTES, AND S. T. SANBORN.

HYDROCARBON-VAPOR APPARATUS.

Specification of Letters Patent No. 14,129, dated January 15, 1856.

*To all whom it may concern:*

Be it known that we, ARI DAVIS and ASAHEL DAVIS, of Lowell, in the county of Middlesex and State of Massachusetts, and CHARLES CUNNINGHAM, of Nashua, in the county of Hillsboro and State of New Hampshire, have invented certain new and useful Improvements in the Manufacture of Hydrogen Gas for Illuminating Purposes and in Impregnating the Same with Carbon, of which the following is a full, clear, and exact description, reference being had to the annexed drawings, making part of this specification, in which—

Figure 1 represents a vertical section through the apparatus employed, before being charged with the materials for the generation of the gas. Fig. 2, a similar section with the apparatus in operation.

Many attempts have been made to impregnate hydrogen gas with carbon, and render it fit for illuminating purposes, and various obstacles have been encountered to the accomplishment of this end.

Where the gas has been impregnated with benzole or other hydrocarbon the latter has been placed in a vessel detached from the generator and the gas has been caused to pass through it. In such cases it has been found necessary to raise the temperature of the hydrocarbon to a certain degree before it will have the desired effect upon the gas. To effect this end the hydrocarbon has been heated by a separate flame of gas, or by other means contrived for the purpose.

Our present invention consists in making use of the heat generated by the action of the gas forming materials, to raise the temperature of the hydrocarbon, whereby the requisite degree of heat is at all times insured, and the expense of the auxiliary apparatus heretofore employed for the purpose is avoided. In order to accomplish this end, the naphtha or other hydrocarbon is placed in the same vessel with the acid in immediate contact therewith. There are various methods by which this may be accomplished but that which we prefer and which has been found to be entirely successful consists in placing the naphtha immediately upon the surface of the acid, in the gas generating vessel in a manner which will be presently more particularly described.

In the well known German apparatus for producing light by throwing a current of hydrogen upon a platina sponge, the gas is produced and retained within a stationary vessel, the mouth or opening in which is immersed beneath the surface of the acid, the zinc being suspended from the stationary vessel into which the acid rises as the gas is drawn off. In an apparatus thus constructed the statical pressure produced by the column of liquid outside the gas holder, is very much greater when the gas chamber is full of gas, than when it is but partially full or when it is being drawn off for use. This feature renders such an arrangement totally unfit for an apparatus to be used for illuminating purposes where a regular and uniform pressure is required. To remedy this inconvenience and at the same time to stop the generation of the gas the moment the holder is full, is the object of the 2nd part of our invention, which consists in suspending the zinc from a floating gas holder, or chamber and causing the latter to rise as it becomes filled with gas, and carry the zinc up out of contact with the acid, where it is held until allowed again to descend by the reduction of the quantity of gas within the holder.

To enable others skilled in the art to understand our invention we will proceed to describe the manner in which we have carried it out.

In the accompanying drawing A is the gas generating chamber; B, the gas holder or chamber from which is suspended the zinc basket C, perforated at *a*, into which is placed the metallic zinc employed in the generation of the gas. The generator, gas holder, and basket may be made of copper, or of lead, or of any other material that will resist the action of the hydrochloric acid.

D, is a metallic rod, which passes through a stuffing box in the center of the gas holder and from which the basket C is suspended. This rod may be forced down or raised by hand for a purpose that will hereafter be explained.

It is however held with sufficient friction to sustain the basket with its contents in the position in which it is placed.

E, is the pipe through which the gas is drawn from the machine, which is connected with the pipes for the distribution of the gas, by means of the india rubber or other flexible tube F, that the gas holder may be free to rise and fall as required. This forms the 3rd part of our invention.

Operation: The requisite quantity of hydrochloric acid is placed in the generator as at G (Fig. 2), and the naphtha or other hydrocarbon is placed upon its surface as seen at $y$. The basket C is then depressed by pressure upon the rod D, and the zinc is introduced. It is then drawn up into the proper position, and the gas holder is inserted within the generator, a cock H, in the vicinity of the apparatus, being opened to permit the air to escape and the zinc to descend below the surface of the acid. In lieu of the flexible tube, a jointed metallic pipe may be employed to connect the gas holder with the distributing pipe. The india rubber tube we have however found fully to answer the purpose. The formation of the gas now commences and as it passes up through the hydrocarbon, becomes sufficiently impregnated therewith to burn with a luminous flame, the heat generated by the action of the material raising the hydrocarbon to the temperature required. The formation of the gas continues until the zinc is raised by the elevation of the gas holder out of contact with the acid, when the parts remain as represented in Fig. 2, until by drawing off the gas the zinc is again allowed to descend into contact with the acid. In lieu of bringing the hydrocarbon thus in immediate contact with the acid it may be placed in a vessel attached to the basket C or in some position either within the gas holder, or in contact with the generator, where it may be warmed by the heat generated by the action of the gas forming materials. These details do not however form any part of our present invention and need not be further described.

What we claim as our invention and desire to secure by Letters Patent is,

Employing the heat set free by the generation of the hydrogen to heat the hydrocarbon used to impregnate the nascent gas as set forth.

ARI DAVIS.
ASAHEL DAVIS.
CHARLES CUNNINGHAM.

Witnesses to signature of Ari Davis and A. Davis:
SAM. COOPER,
P. E. TESCHEMACHER.

Witnesses to C. Cunningham's signature:
BEN. F. EMERSON,
EDWARD WHEELER.